United States Patent
Munoz-Bustamante et al.

(10) Patent No.: US 6,529,299 B1
(45) Date of Patent: Mar. 4, 2003

(54) METHOD AND APPARATUS FOR BROADCASTING OPTICAL SIGNALS WITHIN AN OPTOELECTRIC COMPUTER NETWORK

(75) Inventors: Carlos Munoz-Bustamante, Durham; David Carroll Challener; Daniel McConnell, both of Raleigh, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,839

(22) Filed: Mar. 31, 1999

(51) Int. Cl.7 ............................................... H04B 10/20
(52) U.S. Cl. ...................... 359/118; 359/173; 359/131
(58) Field of Search ................................ 359/118, 127, 359/131, 152, 173, 618

(56) References Cited

U.S. PATENT DOCUMENTS

| | | | |
|---|---|---|---|
| 4,720,634 A | 1/1988 | D'Auria et al. ............. 250/551 |
| 4,732,446 A | 3/1988 | Gipson et al. ................ 385/24 |
| 4,838,630 A | 6/1989 | Jannson et al. ................ 359/3 |
| 5,093,879 A | 3/1992 | Bregman et al. ............. 385/93 |
| 5,093,890 A | 3/1992 | Bregman et al. ............ 385/146 |
| 5,096,279 A | 3/1992 | Hornbeck et al. .......... 359/230 |
| 5,283,447 A | 2/1994 | Olbright et al. .............. 257/85 |
| 5,347,384 A * | 9/1994 | McReynolds et al. ...... 359/118 |
| 5,404,373 A | 4/1995 | Cheng ......................... 372/50 |
| 5,422,901 A | 6/1995 | Lebby et al. ................. 372/36 |
| 5,552,924 A | 9/1996 | Tregilgas .................... 359/224 |
| 5,572,540 A | 11/1996 | Cheng ......................... 372/50 |
| 5,663,819 A * | 9/1997 | Lewis ........................ 359/118 |
| 5,673,284 A | 9/1997 | Congdon et al. ............. 372/50 |
| 5,708,280 A | 1/1998 | Lebby et al. ................. 217/88 |
| 5,789,733 A | 8/1998 | Jackimowicz et al. ...... 235/492 |
| 6,061,159 A * | 5/2000 | Walsh ........................ 359/152 |

* cited by examiner

*Primary Examiner*—Kinfe-Michael Negash
(74) *Attorney, Agent, or Firm*—George E. Grosser; Bracewell & Patterson, L.L.P.

(57) ABSTRACT

An apparatus for broadcasting optical signals within an optoelectric computer network is disclosed. The optoelectric computer network includes multiple computers. Each of the computers includes a first fiber optic cable for sending optical signal beams and a second fiber optic cable for receiving optical signal beams. The apparatus for broadcasting optical signals within the optoelectric computer network includes a lens and a mirror array. The lens is capable of splitting an optical signal beam received from a first fiber optic cable of one of the computers into multiple optical signal beams. The mirror array, which is formed by an array of deformable mirrors, then individually directs each of the split optical signal beams to a respective second fiber optic cable of the selected remaining computers within the optoelectric computer network.

9 Claims, 5 Drawing Sheets

METHOD AND APPARATUS FOR BROADCASTING OPTICAL SIGNALS WITHIN AN OPTOELECTRIC COMPUTER NETWORK

BACKGROUND OF THE INVENTION

1. Technical Field

The present invention relates to a method and apparatus for signal transmission in general, and in particular to a method and apparatus for broadcasting optical signals. Still more particularly, the present invention relates to a method and apparatus for broadcasting optical signals within an optoelectric computer network.

2. Description of the Prior Art

An optoelectric computer network is a computer network in which digital data signals are passed in both optical pathways and electrically conductive pathways. Most, if not all, of the computers within an optoelectric computer network are optoelectric computers. An optoelectric computer is a computer system in which digital data signals are transmitted in both electrically conductive buses and optical buses (or pathways). Typically, an optoelectric computer is equipped with optical link capabilities and may, for example, utilize semiconductor devices that have vertical cavity surface emitting lasers (VCSELs) serving as transducers for optoelectric exchange.

Within an optoelectric computer network, an optical hub may be utilized to provide information exchange among all computers within the network. The optical hub is analogous to an electrical network switch, and it allows concurrent communications among multiple computers. Because the speed of the optical pathways are significantly faster than the electrically conductive pathways, it is difficult for the optical hub to efficiently allocate available optical pathway resources for transmission of optical signals, particularly where the optical pathway capabilities exceed the capabilities of electrically conductive pathways such as legacy busses retained from earlier generations of data processing systems. The present disclosure provides an apparatus for broadcasting optical signals within an optoelectric computer network so that a single optical pathway can be used to broadcast an optical signal to multiple recipients, chosen by the broadcaster. This can be important for delivering content, such as video on demand or classroom lectures, over an optoelectric computer network.

SUMMARY OF THE INVENTION

An optoelectric computer network includes multiple computers. Each of the computers includes a first fiber optic cable for sending optical signal beams and a second fiber optic cable for receiving optical signal beams. In accordance with a preferred embodiment of the present invention, an apparatus for broadcasting optical signals within the optoelectric computer network includes a lens and a mirror array. The lens is capable of splitting an optical signal beam received from a first fiber optic cable of one of the computers into multiple optical signal beams. The mirror array, which is formed by an array of deformable mirrors, then individually directs each of the split optical signal beams to a respective second fiber optic cable of the selected remaining computers within the optoelectric computer network.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
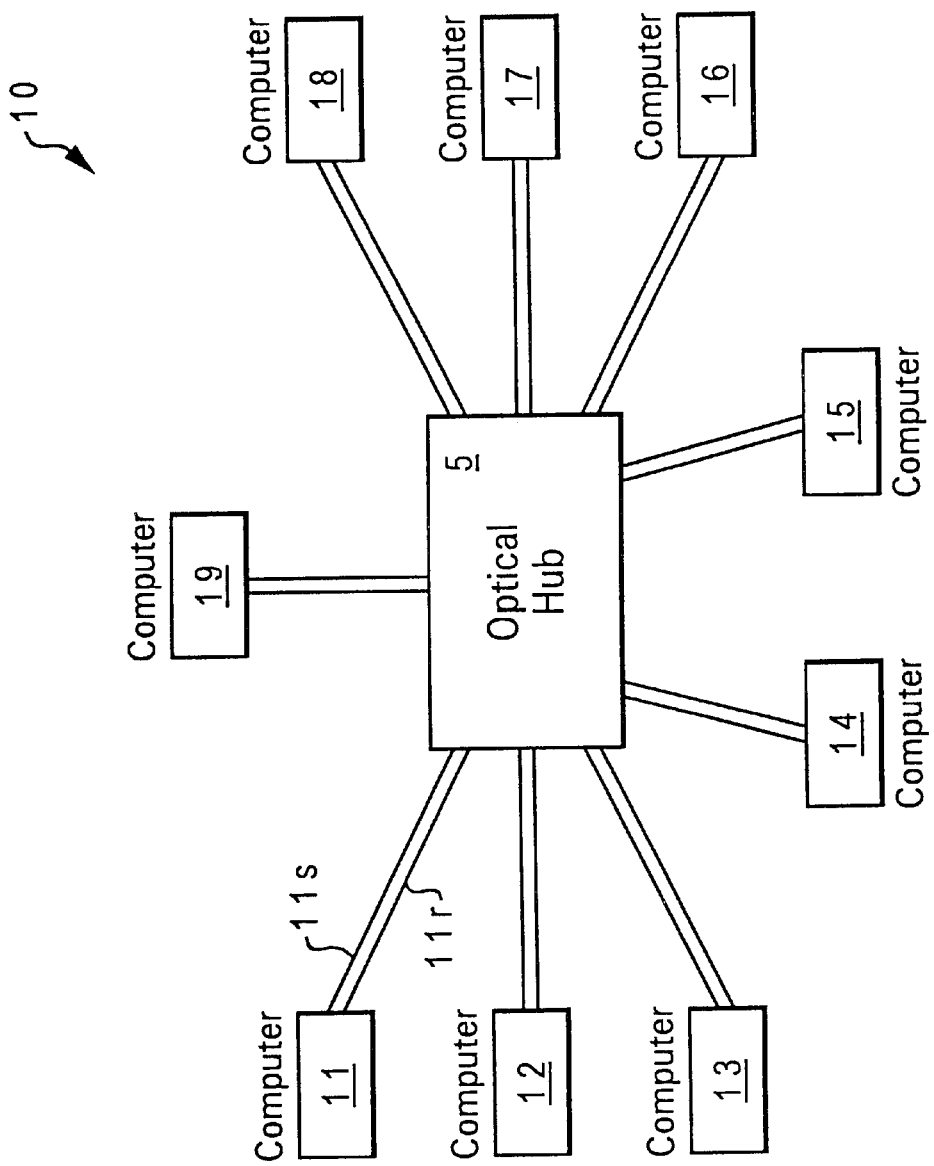
FIG. 1 is a block diagram of an optoelectric computer network having optical links, in accordance with a preferred embodiment of the present invention.

Referring now to the drawings and in particular to FIG. 1, there is illustrated a block diagram of an optoelectric computer network having optical links, in accordance with a preferred embodiment of the present invention. Optoelectric computer network 10 may be a local-area network (LAN) or a wide-area network (WAN). As shown, optoelectric computer network 10 includes computers 11–19 and an optical hub 5. Each of computers 11–19 may be a personal computer, a mid-range computer, or a mainframe computer. Preferably, each of computers 11–19 has optical link capabilities such that all computers 11–19 can be interconnected to each other via an optical hub 5. The optical link between one of computers 11–19 and optical hub 5 comprises at least two fiber optic cables, one for transmitting optical signals to optical hub 5 and the other for receiving optical signals from optical hub 5. For example, a fiber optic cable 11s conveys optical signals from computer 11 to optical hub 5, and a fiber optic cable 11r conveys optical signals from optical hub 5 to computer 11. All communication among computers 11–19 is performed by optical hub 5. In essence, optical hub 5 acts a network switch for computers 11–19 within optoelectric computer network 10.

Figure 2:
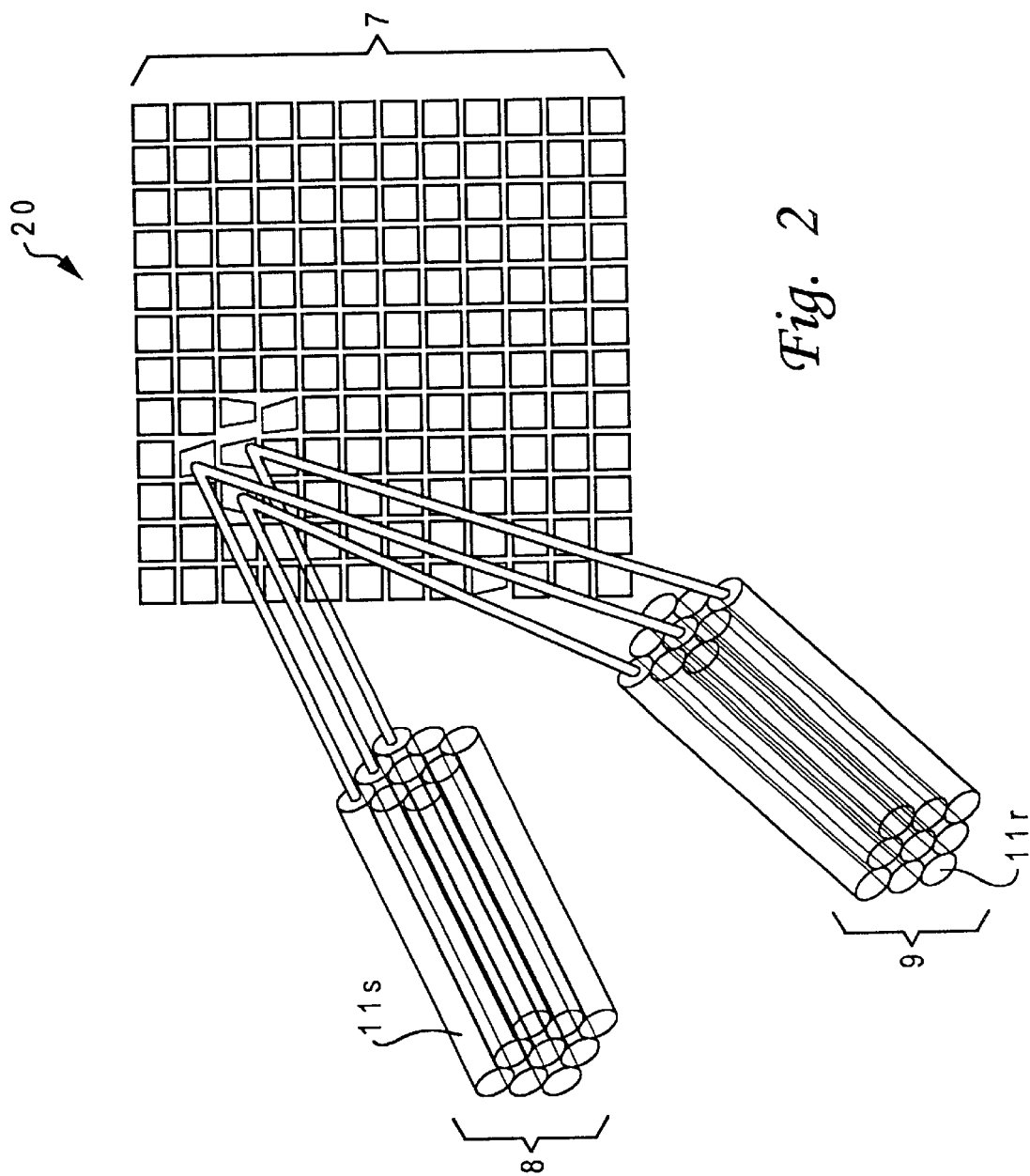
FIG. 2 is a graphical view of a network switching mechanism within the optical hub from FIG. 1, in accordance with a preferred embodiment of the present invention.

With reference now to FIG. 2, there is illustrated a graphical view of a network switching mechanism within optical hub 5, in accordance with a preferred embodiment of the present invention. Network switching mechanism 20 includes a mirror array 7 and two fiber optic bundles 8, 9. Mirror array 7 is preferably a deformable mirror device (DMD) having multiple deformable mirrors, such as deformable mirror 21, organized in the form of an array. Details of a DMD will be explained later. Fiber optic bundle 8 comprises a group of fiber optic cables, each corresponds to one of computers 11–19 from FIG. 1 and is utilized to send optical signals from a respective computer to mirror array 7. For example, fiber optic cable 11s sends optical signals from computer 11 (from FIG. 1) to mirror array 7. Similarly, fiber optic bundle 9 comprises a group of fiber optic cables, each corresponding to one of computers 11–19 from FIG. 1 and is utilized to convey optical signals from mirror array 7 to a respective computer. For example, fiber optic cable 11r receives optical signals from mirror array 7 to computer 11. Each mirror 21 within mirror array 7 can be independently adjusted to reflect an optical signal sending from a fiber optic cable within fiber optic bundle 8 to a desired fiber optic cable within fiber optic bundle 9. Preferably, more than one optical signal can be transmitted at the same time by different fiber optic cables within a fiber optic bundle, as depicted in FIG. 2. Thus, point-to-point communications among any two of computers 11–19 can be established via the angle adjustment of mirrors 21 within mirror array 7.

Figure 3:
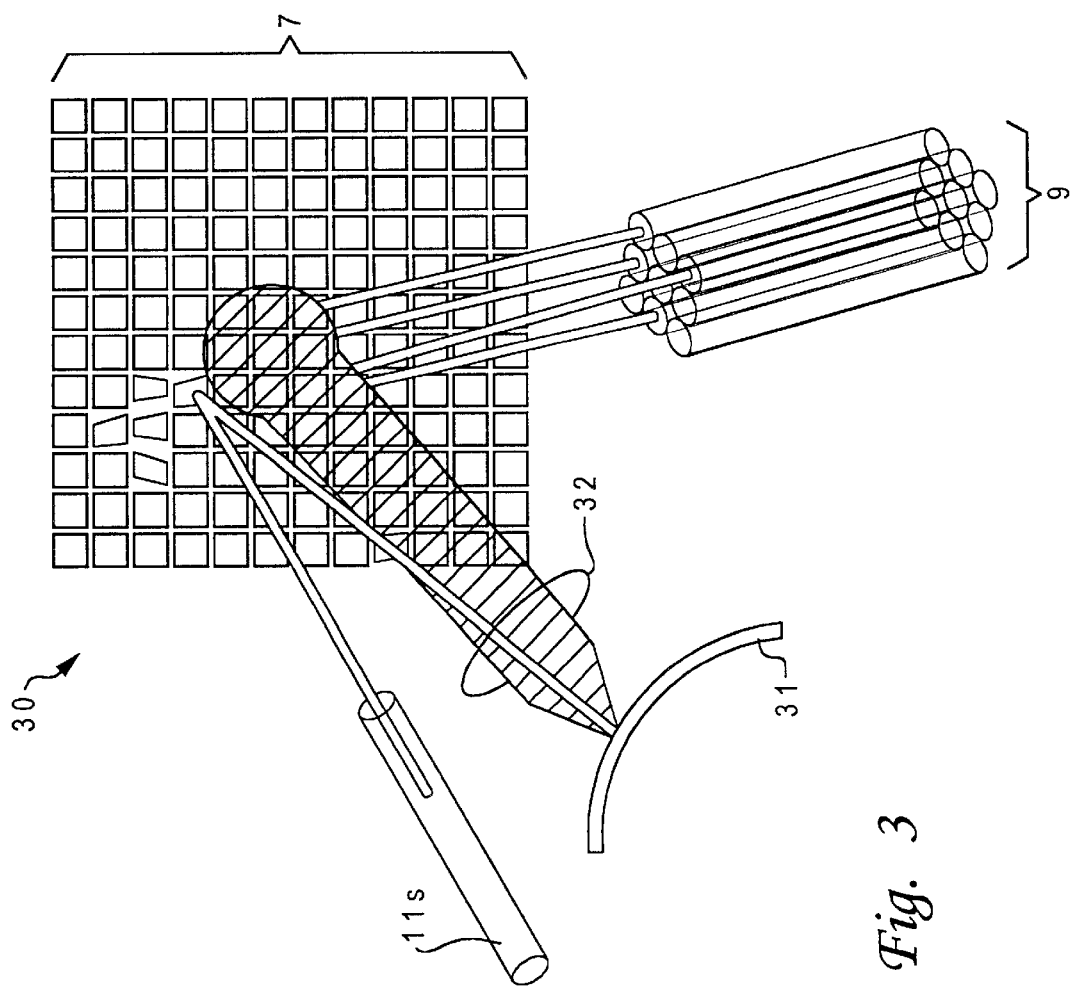
FIG. 3 is a graphical view of a network broadcasting mechanism within the optical hub from FIG. 1, in accordance with a preferred embodiment of the present invention.

Referring now to FIG. 3, there is illustrated a graphical view of a network broadcasting mechanism within optical hub 5, in accordance with a preferred embodiment of the present invention. As shown, network broadcasting mechanism 30 includes a convex mirror 31 and a lens 32 along with mirror array 7 and two fiber optic bundles 8, 9 as shown FIG. 2. In FIG. 3, only fiber optic cable 11s of fiber optic bundle 8 is shown, for the sake of simplicity. If computer 11 (from FIG. 1) desires to broadcast certain information to all or multiple selected computers within computer network 10, computer 11 first sends a corresponding optical signal beam to one of mirrors 21 within mirror array 7 via a fiber optic cable, such as fiber optic cable 11s. Instead of reflecting the optical signals directly to fiber optic bundle 9 (as depicted in FIG. 2), the mirror within mirror array 7 reflects the optical signal beam to convex mirror 31, which subsequently directs the optical signal beam to lens 32. Lens 32, which is shaped with a specific focal length as it is well-understood by those skilled in the relevant art, splits the single optical signal beam into several optical signal beams and directs the optical signal beams to various mirrors 21 within mirror array 7. All the optical signal beams are substantially parallel with each other. Once again, each mirror 21 within mirror array 7 is then independently adjusted to an angle such that all the optical signal beams coming from lens 32 are guided to a corresponding fiber optic cable within fiber optic bundle 9. As a result, the information from computer 11 will be broadcasted to the selected remaining computers within optoelectric computer network 10. Note that the mirror corresponding to computer 11 can be adjusted such that the optical signal beam will not be transmitted to fiber optic 11r of fiber optic bundle 9, if desired.

As mentioned earlier, mirror array 7 is preferably a DMD. A DMD is a transducer that modulates incident light in a spatial pattern corresponding to an electrical or optical input. The incident light may be modulated in its phase, intensity, polarization, or direction, and the light modulation may achieved by a variety of materials exhibiting various optoelectric or optomagneto effects and by materials that modulate light via surface deformation. A DMD is typically in the form of an array of pixels (or mirrors), each pixel individually addressable and containing at least one deflectable reflecting beam (or a flap). A DMD operates by reflecting light off of the pixels, and the reflected light is modulated by varying the deflection of the deflectable beams.

Figure 4A:
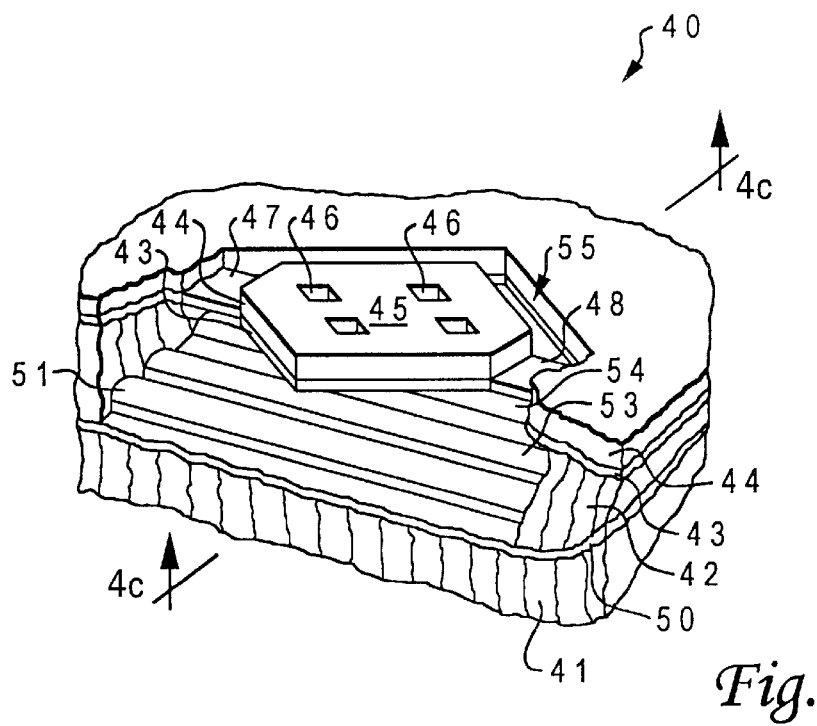
FIGS. 4a–4c are a perspective view, a plan view, and a cross-sectional view, respectively, of a single pixel of a deformable mirror device, in accordance with a preferred embodiment of the present invention.
Figure 4B:
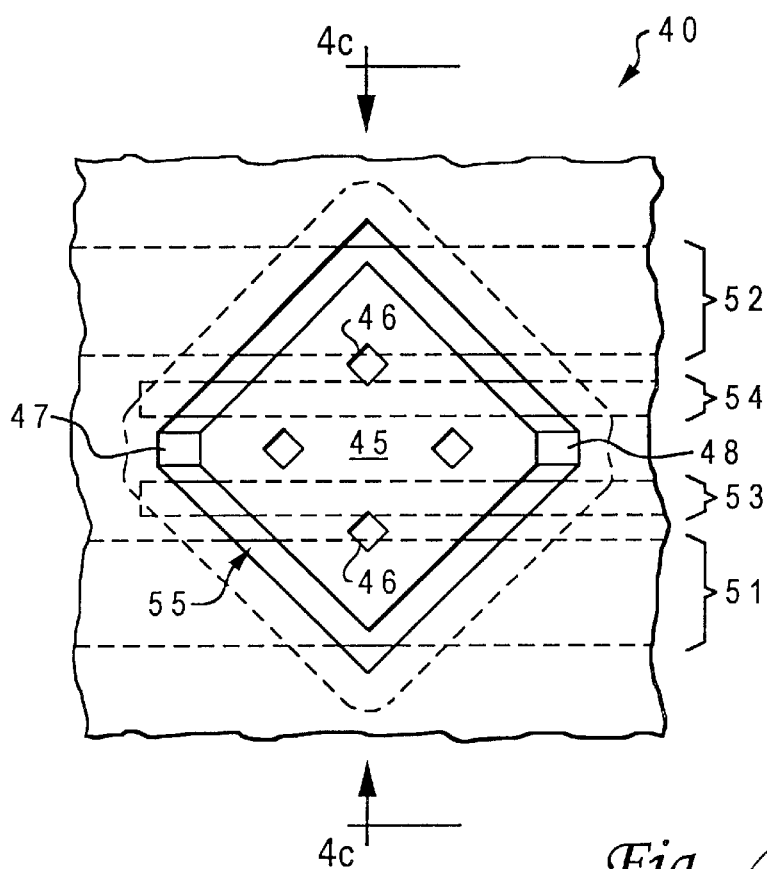
Figure 4C:
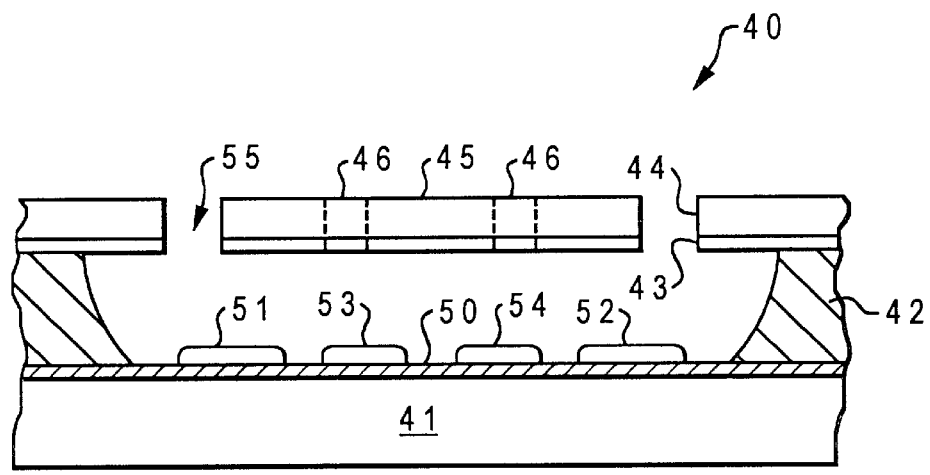

With reference now to FIGS. 4a–4c, there are depicted a single pixel of a DMD in perspective view, in plan view, and in cross-sectional view, respectively, in accordance with a preferred embodiment of the present invention. FIG. 4c is a cross-section along line c—c as indicated in FIGS. 4a and 4b. A pixel within a DMD is basically a beam covering a shallow well. As shown, a pixel 40 includes a silicon substrate 41, an insulating spacer 42, a metal hinge layer 43, a metal beam layer 44, a beam 45, and multiple plasma etch access holes 46 formed in beam 45. Portions 47 and 48 of hinge layer 43 that are not covered by beam layer 44 form torsion hinges (torsion rods) attaching beam 45 to the portion of metal hinge layer 43 and metal beam layer 44 supported by spacer 42. Electrodes 54–54 are located between spacer 42 and substrate 44 and are isolated from substrate 41 by silicon dioxide layer 50.

A preferred set of dimensions for pixel 40 is as follows: beam 45 is a square with sides 12.5 microns long, spacer 42 is 4.0 microns thick, hinge layer 43 is 800 Å thick, beam layer 44 is 3,600 Å thick, each of hinges 47, 48 is 4.6 microns long and 1.8 microns wide, plasma etch access holes 46 are 2.0 microns square, and plasma etch access gap 55 (the space between beam 45 and the remainder of beam layer 44) is 2.0 microns wide. An alternative set of dimensions for pixel 40 to yield a maximum beam deflection angle of about ten degrees is as follows: beam 45 is a square with side 19 microns long, spacer 42 is 2.3 microns thick, hinge layer 43 is 750 Å thick, beam layer 44 is 3,000 Å thick, each of torsion hinges 47, 48 is 4.6 microns long and 1.0 microns wide, plasma etch access holes 46 are 1.5 microns square, and plasma etch access gap 55 is 1.0 micron wide.

Substrate 41 is silicon having resistivity about 10 ohm-cm. Spacer 42 is an insulator; both hinge layer 43 and beam layer 44 are an alloy of aluminum, titanium, and silicon (Ti:Si:Al) with 0.2% Ti and 1% Si. This alloy has a coefficient of thermal expansion not drastically different from spacer 42 and thus minimizes the stress between the metal layers and spacer 42 generated during the fabrication process. Note that any stress between layers in the beam or hinge would cause warping or curling of the beam or hinge, and any stress between the metal and the spacer can cause buckling or warping of the free portion of the metal over the well.

Pixel 40 is operated by applying a voltage between metal layers 43, 44 and electrodes 53 or 54 on substrate 41; beam 45 and the electrodes form the two plates of an air gap capacitor, and the opposite charges induced on the two plates by the applied voltage exert electrostatic force attracting beam 45 to substrate 41, whereas electrodes 51 and 52 are held at the same voltage as beam 45. This attractive force causes beam 45 to twist at hinges 47, 48 and be deflected towards substrate 41.

Figure 5:
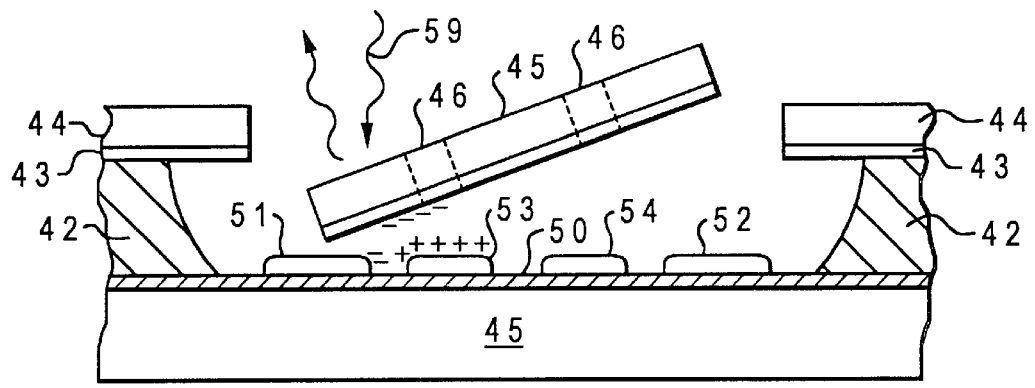
FIG. 5 is a schematic view of a beam deflection in accordance with a preferred embodiment of the present invention.

Referring now to FIG. 5, there is illustrated a schematic view of the above-mentioned deflection together with an indication of the charges concentrated at the regions of smallest gap for a positive voltage applied to electrode 53. For voltages in the range of 20 volts, the deflection is in the range of 2 degrees. However, if hinge 47 were made longer or thinner or narrower, the deflection would increase as the compliance of hinge 47 varies linearly with the inverse of its width and directly with the square of its length and inversely with the cube of its thickness. Note that the thickness of beam 45 prevents significant warping of beam 45 due to surface stress generated during processing, but that the thinness of hinge 47 allows for large compliance. FIG. 5 also indicates the reflection of an optical signal beam 59 from deflected beam 45 as may occur during operation.

As has been described, the present invention provides an apparatus for broadcasting optical signals within an optoelectric computer network. The present invention provides networking broadcasting capabilities by having a modulatable light source, focused on a first bundle of fiber optics, a second bundle of fiber optics, and an electrically controlled DMD interposed between terminations of the two fiber optic bundles. By controlling the DMD, the interconnections between the fiber optic bundles can be controlled to establish and/or break optical signal communication between the fiber optic bundles so as to divide down a broader array into a narrower array, to control the optical interconnection of selected portions of the fiber optic bundles, and selectively preclude the optical interconnection of certain portions of the fiber optic bundles.

While the invention has been particularly shown and described with reference to a preferred embodiment, it will be understood by those skilled in the art that various changes in form and detail may be made therein without departing from the spirit and scope of the invention.

What is claimed is:

1. An apparatus for broadcasting optical signals within an optoelectric computer network, wherein said optoelectric computer network includes a plurality of computers, wherein each of said plurality of computers includes a first fiber optic cable for sending optical signal beams and a second fiber optic cable for receiving optical signal beams, said apparatus comprising:

a lens capable of splitting an optical signal beam received from a first fiber optic cable of one of said plurality of computers into a plurality of optical signal beams; and a mirror array having a plurality of deformable mirrors that individually directs each of said plurality of split optical signal beams to a respective second fiber optic cable of the selected remaining said plurality of computers.

2. The apparatus according to claim 1, wherein said mirror array is a deformable mirror device.

3. The apparatus according to claim 1, wherein said apparatus further includes a convex mirror.

4. An optoelectric computer network, comprising:

a plurality of computers, wherein each of said plurality of computers includes a first fiber optic cable for sending optical signal beams and a second fiber optic cable, for receiving optical signal beams; and an optical hub coupled to said plurality of computers, wherein said optical hub includes:

a lens capable of splitting an optical signal beam received from a first fiber optic cable of one of said plurality of computers into a plurality of optical signal beams; and a mirror array having a plurality of deformable mirrors that individually directs each of said plurality of split optical signal beams to a respective second fiber optic cable of the selected remaining said plurality of computers.

5. The optoelectric computer network according to claim 4, wherein said mirror array is a deformable mirror device.

6. The optoelectric computer network according to claim 4, wherein said apparatus further includes a convex mirror.

7. A method for broadcasting optical signals within an optoelectric computer network, wherein said optoelectric computer network includes a plurality of computers, wherein each of said plurality of computers includes a first fiber optic cable for sending optical signal beams and a second fiber optic cable for receiving optical signal beams, said method comprising the steps of:

splitting an optical signal beam received from a first fiber optic cable of one of said plurality of computers into a plurality of optical signal beams; and utilizing a mirror array having a plurality of deformable mirrors to individually direct each of said plurality of split optical signal beams to a respective second fiber optic cable of the selected remaining said plurality of computers.

8. The method according to claim 7, wherein said mirror array is a deformable mirror device.

9. The method according to claim 7, wherein said splitting step further includes a step of utilizing a lens for splitting said optical signal beam.

* * * * *